US009003916B2

(12) United States Patent
Sasaki et al.

(10) Patent No.: US 9,003,916 B2
(45) Date of Patent: Apr. 14, 2015

(54) SUPPORT STRUCTURE FOR GEARSHIFT LEVER

(75) Inventors: Naomasa Sasaki, Aichi (JP); Daisuke Yamamoto, Zama (JP)

(73) Assignees: Kabushiki Kaisha Tokai Rika Denki Seisakusho, Aichi (JP); Nissan Motor Co., Ltd., Kanagawa (JP)

( * ) Notice: Subject to any disclaimer, the term of this patent is extended or adjusted under 35 U.S.C. 154(b) by 182 days.

(21) Appl. No.: 13/700,316

(22) PCT Filed: May 27, 2011

(86) PCT No.: PCT/JP2011/062185
§ 371 (c)(1),
(2), (4) Date: Feb. 28, 2013

(87) PCT Pub. No.: WO2011/152301
PCT Pub. Date: Dec. 8, 2011

(65) Prior Publication Data
US 2013/0145888 A1 Jun. 13, 2013

(30) Foreign Application Priority Data
May 31, 2010 (JP) .................................. 2010-124696

(51) Int. Cl.
*B60K 20/00* (2006.01)
*G05G 9/00* (2006.01)
(Continued)

(52) U.S. Cl.
CPC ............ *F16H 59/0278* (2013.01); *F16H 59/04* (2013.01); *F16H 2059/0273* (2013.01)

(58) Field of Classification Search
CPC . F16H 59/02; F16H 59/0208; F16H 59/0278; F16H 2059/026
USPC ............................................ 74/473.1, 473.3
See application file for complete search history.

(56) References Cited

U.S. PATENT DOCUMENTS 5,445,046 A * 8/1995 Kataumi et al. ................ 74/527
5,497,673 A * 3/1996 Kataumi et al. ............. 74/473.3
(Continued)

FOREIGN PATENT DOCUMENTS

CN 1161288 10/1997
CN 1199208 11/1998
(Continued)

OTHER PUBLICATIONS

International Preliminary Report on Patentability for PCT/JP2011/062185, mailed Jan. 8, 2013.
(Continued)

*Primary Examiner* — Justin Krause
(74) *Attorney, Agent, or Firm* — Greenblum & Bernstein, P.L.C.

(57) ABSTRACT

A support structure for a shift lever includes a rotation shaft coupled to the shift lever, a base plate including a support that pivotally supports the rotation shaft to tiltably support the shift lever, a restriction member coupled to the base plate, and a fixing portion that fixes the restriction member to the base plate. The base plate includes a guide that guides the coupling of the restriction member to the base plate. The rotation shaft includes a main protrusion, which protrudes from an end surface of the rotation shaft in an axial direction, and an auxiliary protrusion, which protrudes in the axial direction from the end surface by a smaller protrusion amount than the main protrusion. The restriction member is fixed in contact with the main protrusion so that the restriction member cooperates with the support to restrict movement of the rotation shaft in the axial direction.

7 Claims, 7 Drawing Sheets

(51) Int. Cl.
    *F16H 59/04*     (2006.01)
    *F16H 59/02*     (2006.01)

(56) References Cited

U.S. PATENT DOCUMENTS

| | | | |
|---|---|---|---|
| 6,029,537 | A | 2/2000 | Nagao |
| 7,730,802 | B2 * | 6/2010 | Takikawa .................... 74/473.1 |
| 2002/0194943 | A1 * | 12/2002 | Junge et al. ................. 74/473.1 |
| 2003/0209101 | A1 | 11/2003 | Kabo et al. |
| 2014/0053673 | A1 * | 2/2014 | Choi et al. ................... 74/473.3 |

FOREIGN PATENT DOCUMENTS

| | | |
|---|---|---|
| CN | 2579721 | 10/2003 |
| CN | 1456457 | 11/2003 |
| JP | 7-20462 | 4/1995 |
| JP | 09-210188 | 8/1997 |
| JP | 2001-030789 | 2/2001 |

OTHER PUBLICATIONS

Chinese Office Action for CN201180037115.2 dated Feb. 4, 2015.

* cited by examiner

SUPPORT STRUCTURE FOR GEARSHIFT LEVER

TECHNICAL FIELD

The present invention relates to a support structure for a shift lever that tiltably supports a shift lever.

BACKGROUND ART

As known in the art, a vehicle includes a shift device that switches gear modes of a transmission based on the operation of a shift lever. Patent document 1 describes a prior art example of such a shift device. FIG. 1 shows the shift device described in patent document 1. As shown in FIG. 1, the shift device includes a rotation shaft 20 rotatably supported by a base plate (not shown). A coupling pin 22 couples the rotation shaft 20 and a basal portion of a shift lever 21. Such a structure of the shift device tiltably supports the shift lever 21 in two directions as viewed in the drawing, a shift direction and a selection direction.

Patent Document 1: Japanese Laid-Open Patent Publication No. 2001-30789

SUMMARY OF THE INVENTION

In typical prior art shift devices, including the shift device described in patent document 1, the rotation shaft 20 is required to be correctly coupled to the base plate so that the rotation shaft 20 does not loosen. Thus, in such a shift device, for example, as shown in FIG. 1, a thread 20a is arranged at an end portion of the rotation shaft 20. The end portion of the rotation shaft 20 is inserted into a shaft hole of the base plate. A nut is fastened to the thread 20a to fix the rotation shaft 20 to the base plate. With such a structure, adjustment of the fastening torque of the nut suppresses loosening of the rotation shaft 20.

However, in such a shift device, the nut is required to be fastened to the rotation shaft 20 after coupling the rotation shaft 20 to the base plate. This increase coupling steps of the shift device.

Accordingly, it is an object of the present invention to provide a support structure for a shift lever that reduces the number of manufacturing steps and suppresses loosening of the rotation shaft while also improving the operability of the shift lever.

One aspect of the present invention is a support structure for a shift lever including a rotation shaft coupled to the shift lever and including first and second end portions. A base plate includes a support that pivotally supports the first and second end portions of the rotation shaft to tiltably support the shift lever. A restriction member is coupled to the base plate in contact with the rotation shaft. A fixing portion fixes the restriction member to the base plate. The base plate includes a guide that guides the coupling of the restriction member to the base plate. The rotation shaft includes a main protrusion, which protrudes in an axial direction of the rotation shaft from an end surface at one of the first and second end portions of the rotation shaft, and an auxiliary protrusion, which protrudes in the axial direction of the rotation shaft from the end surface by a smaller protrusion amount than the main protrusion. The restriction member is fixed in contact with the main protrusion of the rotation shaft so that the restriction member cooperates with the support to restrict movement of the rotation shaft in the axial direction.

DESCRIPTION OF THE EMBODIMENTS

A shift device that uses a support structure for a shift lever according to one embodiment of the present invention will now be described with reference to FIGS. 2 to 7.

Figure 1:
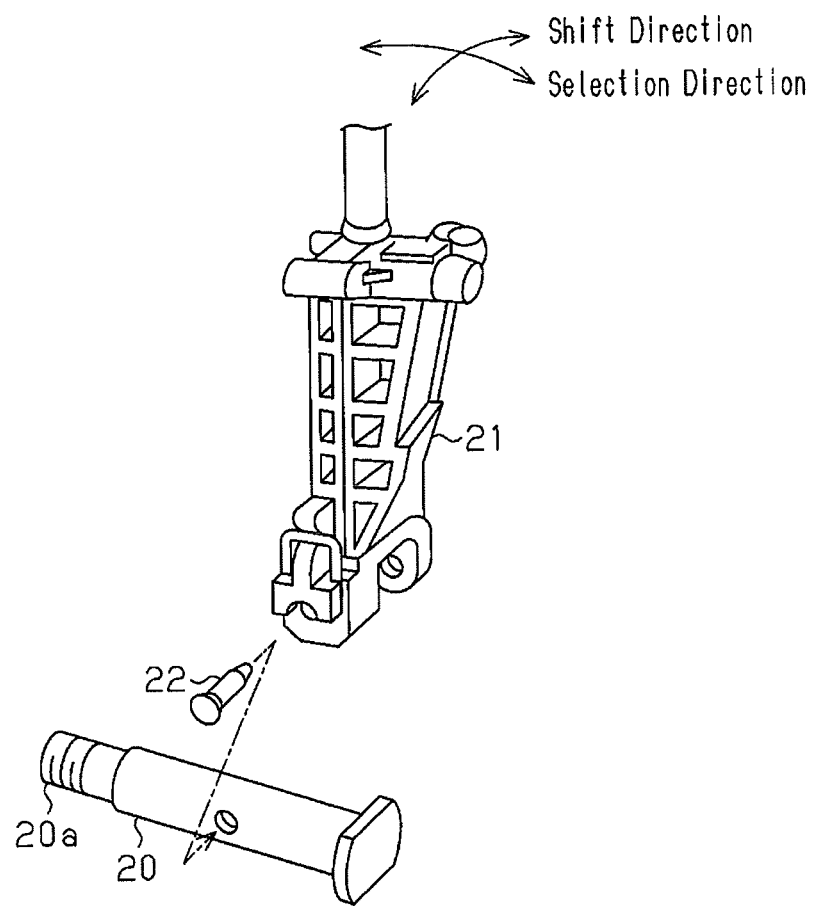
FIG. 1 is a perspective view showing the structure of a shift device in the prior art.
Figure 2:
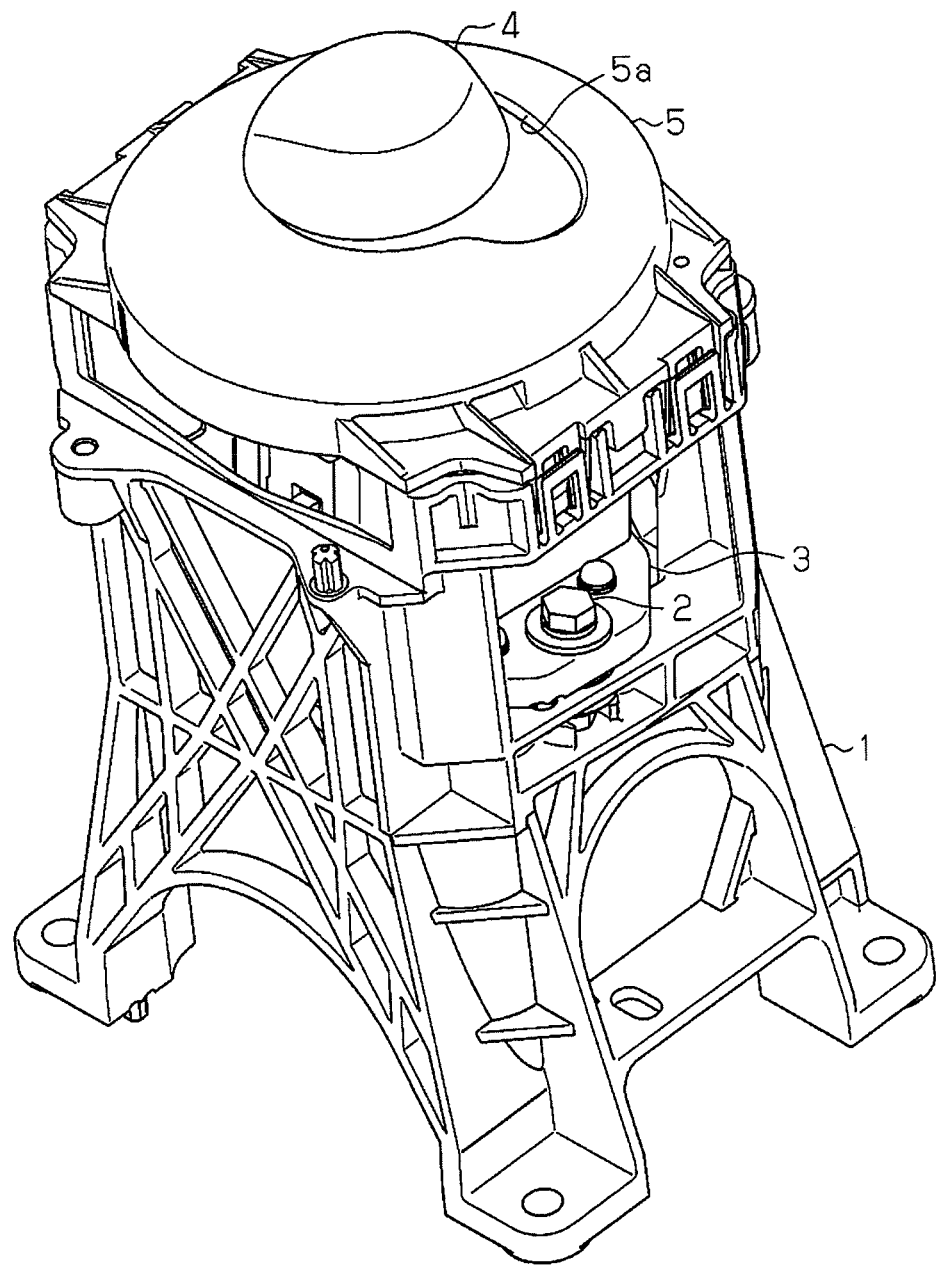
FIG. 2 is a perspective view showing the structure of a shift device using a support structure for a shift lever according to one embodiment.

FIG. 2 is a perspective view showing the structure of the shift device in the present embodiment.

As shown in FIG. 2, the shift device basically includes a housing 1, which is fixed to a vehicle, a base plate 3, which is fastened by bolts 2 to the housing, a shift lever 4, which has a basal portion supported by the base plate 3, and a shift panel 5, which is coupled to an upper portion of the base plate 3. The shift panel 5 includes a triangular shift gate 5a. The shift lever 4 is inserted through the shift gate 5a. This guides the movement of the shift lever 4. To reduce the weight of the shift device, the housing 1, base plate 3, shift lever 4, and shift panel 5 are formed from a resin material. Further, the shift device is of the so-called by-wire type. A sensor unit (not shown) is used to detect the position of the shift lever 4, which is moved along the shift gate 5a. The shift device switches the mode of an automatic transmission based on the detected position.

The structure of the base plate 3 and the shift lever 4 will now be described in detail with reference to FIGS. 3 and 4.

Figure 3:
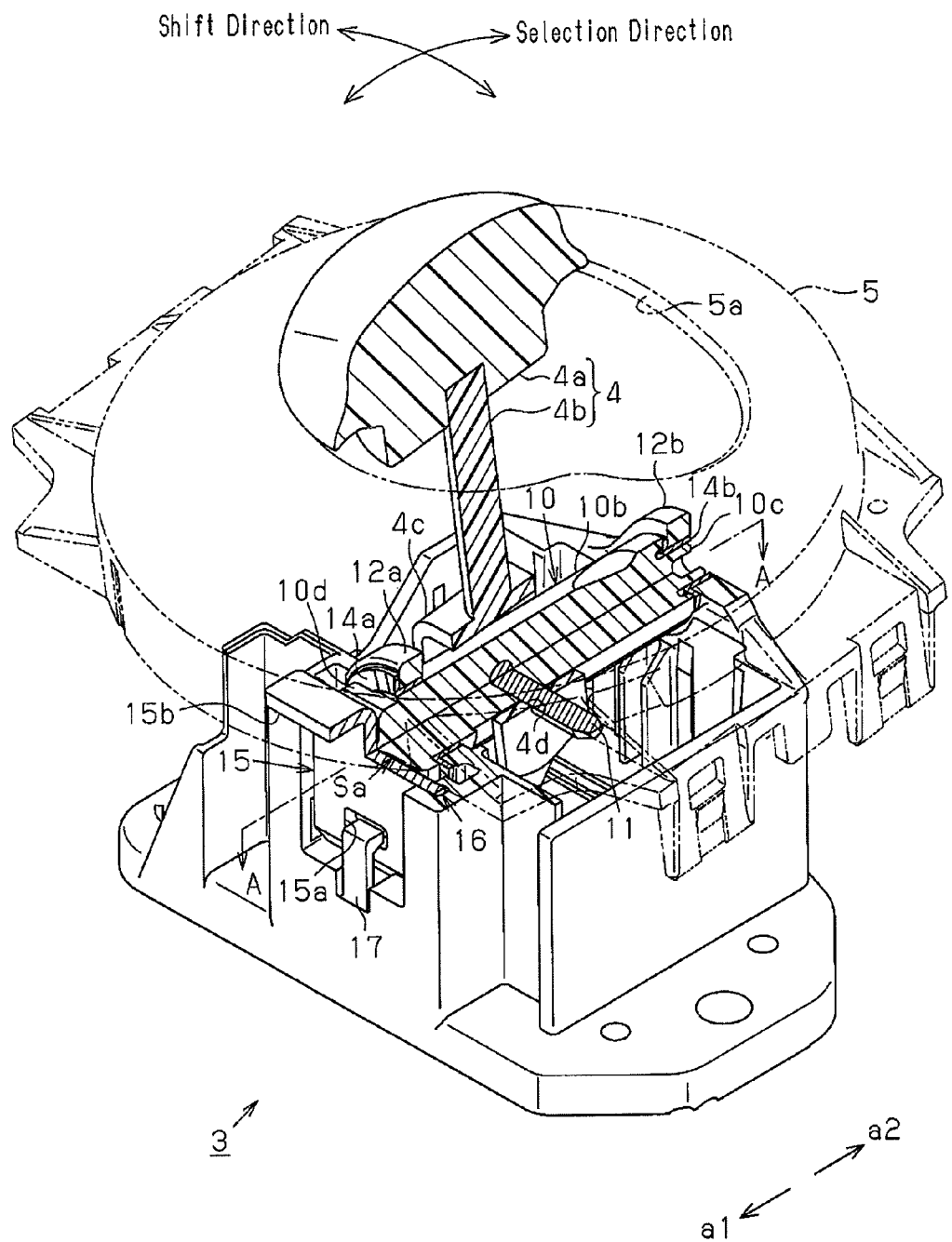
FIG. 3 is a perspective view showing the cross-sectional structure of a base plate and shift lever arranged in the shift device of FIG. 1.

FIG. 3 shows the cross-sectional structure of the base plate 3 and the shift lever 4. Further, FIG. 4 is a perspective view showing the exploded structure of the base plate 3 and the shift lever 4. For the sake of convenience, the sensor unit is not shown in FIGS. 3 and 4.

Figure 4:
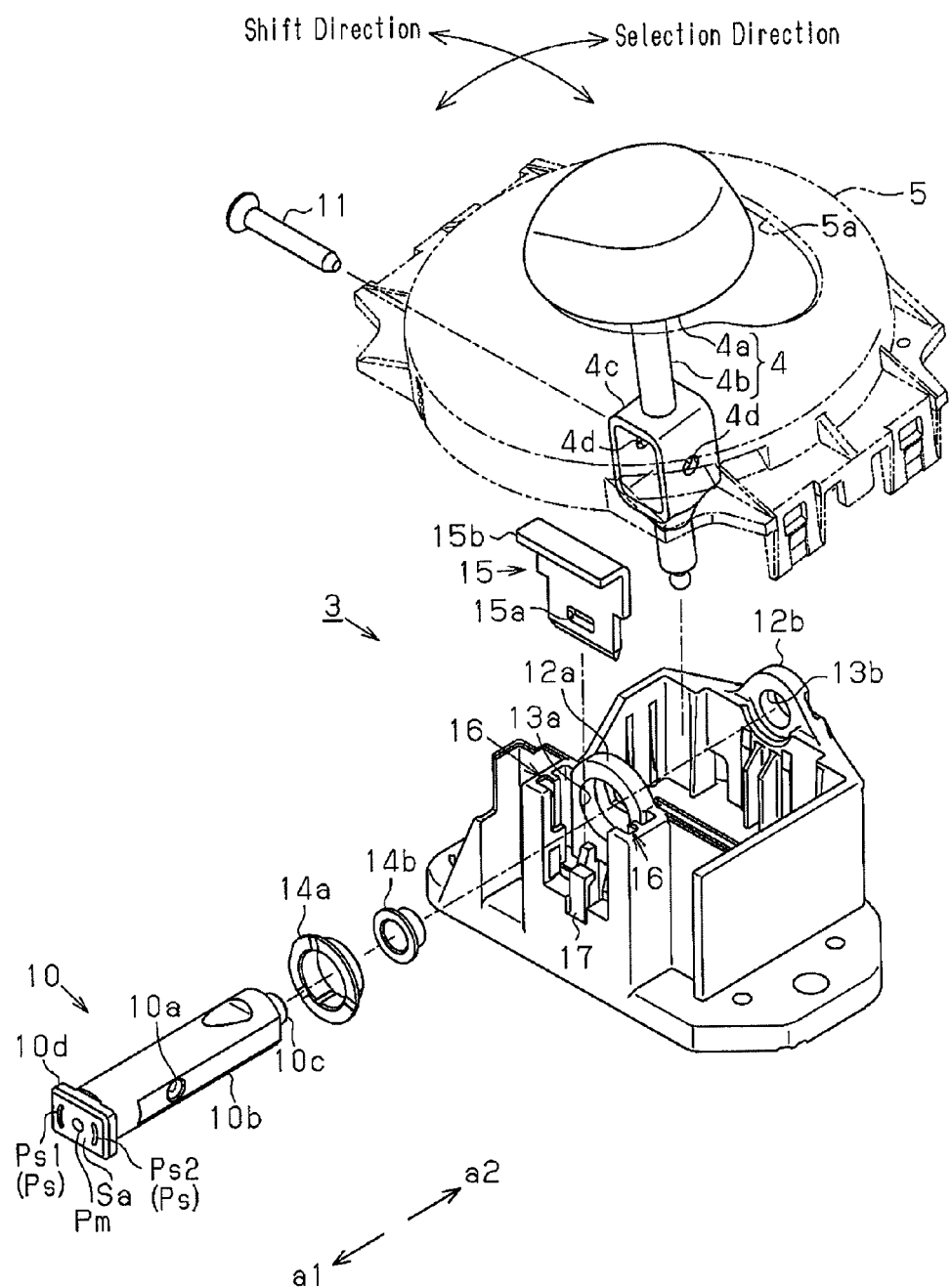
FIG. 4 is an exploded perspective view showing the base plate and shift lever of FIG. 3.

As shown in FIG. 4, the shift lever 4 basically includes a grip 4a, which is grasped by a user, and a rod 4b, which is coupled to the grip 4a. The rod 4b includes a tube 4c, through which a rotation shaft 10 is inserted. The tube 4c includes side walls having insertion holes 4d through which a coupling pin 11 is inserted.

The rotation shaft 10 includes a cylindrical shaft portion 10b, a tetragonal plate-shaped head portion 10d, which is formed at a distal portion of the shaft portion 10b, and a reduced diameter portion 10c, which extends from a basal portion of the shaft 10b. The shaft portion 10b includes an insertion hole 10a through which the coupling pin 11 is inserted. The coupling pin 11, which is inserted through the insertion holes 4d of the tube 4c and the insertion hole 10a of the rotation shaft 10, couples the shift lever 4 to the rotation shaft 10 tiltably in a selection direction, which is indicated in the drawing. The rotation shaft 10 is also formed from a resin material.

The base plate 3 has opposing walls respectively including supports 12a and 12b, which support the rotation shaft 10. The base plate 3 is also formed from a resin material. The support 12a includes a shaft hole 13a through which the shaft portion 10b of the rotation shaft 10 is inserted. The support 12b includes a shaft hole 13b into which the reduced diameter portion 10c of the rotation shaft 10 is inserted. Bearings 14a and 14b are arranged in eth shaft holes 13a and 13b, respectively. The bearings 14a and 14b rotatably support the shaft portion 10b and reduced diameter portion 10c of the rotation shaft 10, respectively. By supporting the rotation shaft 10 with the supports 12a and 12b in this manner, the shift lever 4 is tiltably supported in a shift direction, which is indicated in the drawing.

As shown in FIG. 3, a restriction member 15, which is plate-shaped and formed from metal, is arranged on the base plate 3 in contact with a peak surface Sa of the head portion 10d of the rotation shaft 10. The restriction member 15 restricts movement of the rotation shaft 10 in the direction indicated by arrow a1. Further, in the present embodiment, the surface at the opposite side of the peak surface Sa of the rotation shaft 10 is supported by the support 12a through the bearing 14a, and a basal surface of the shaft portion 10b is supported by the support 12b through the bearing 14b. This restricts movement of the rotation shaft 10 in the direction indicated by arrow a2. In the present embodiment, the restriction member 15 cooperates with the supports 12a and 12b to restrict movement of the rotation shaft 10 in the axial direction. This suppresses loosening of the rotation shaft 10.

As shown in FIG. 4, a fitting hole 15a extends in a plate thickness direction through a lower portion of the restriction member 15. The base plate 3 includes guide grooves 16, which serve as a guide that guides the coupling of the restriction member 15, and a fitting hook 17, which is fitted to the fitting hole 15a when the restriction member 15 is guided by the guide grooves 16 and coupled. In this manner, the base plate 3 has a structure in which the fitting hook 17 is fitted to the fitting hole 15a of the restriction member 15 to fix the restriction member 15. That is, the fitting hook 17 functions as a fixing portion that fixes the restriction member. In such a structure, when manufacturing the shift device, the restriction member 15 can be fixed by just coupling the restriction member 15 to the base plate 3 along the guide grooves 16. This facilitates the coupling of the restriction member 15. Thus, compared to when fastening a nut to the rotation shaft after coupling the rotation shaft to the base plate like in the prior art described above, the number of manufacturing steps can be reduced. In the present embodiment, to further improve workability when coupling the restriction member 15, a flange 15b is formed at a top portion of the restriction member 15. More specifically, the arrangement of the flange 15b on the restriction member 15 allows for a person to use the flange 15b when coupling the restriction member 15 to the base plate 3 manually or with a jig. Thus, the workability can be improved.

The structure of the rotation shaft 10 will now be described in detail with reference to FIGS. 5 and 6.

Figure 5:
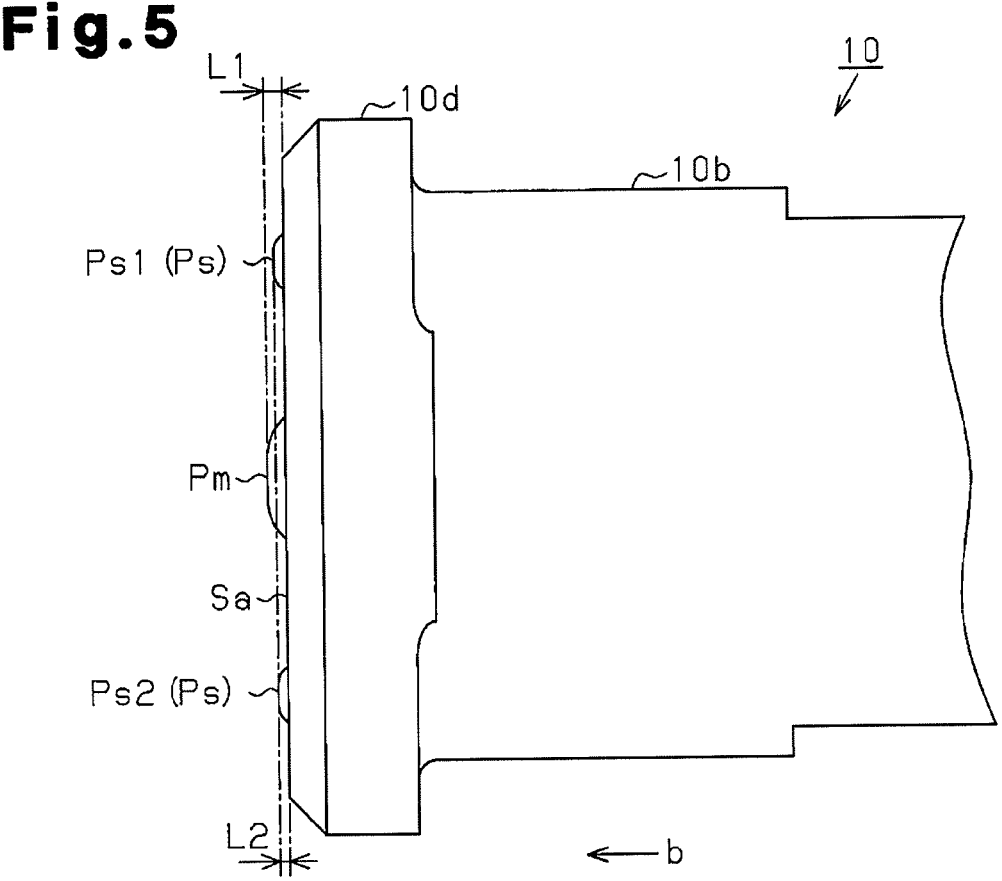
FIG. 5 is a plan view showing the structure near a head portion of a rotation shaft that supports the shift lever of FIG. 4.
Figure 6:
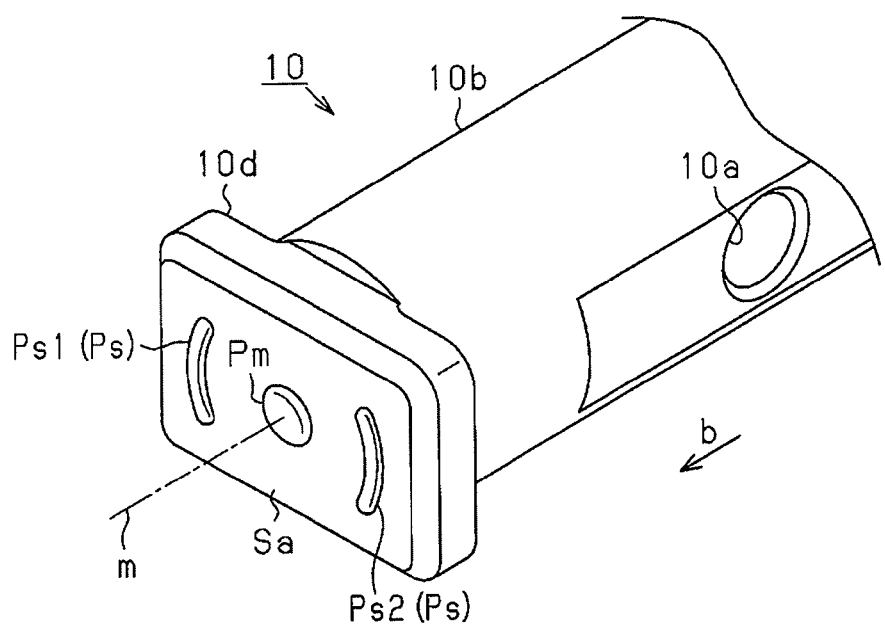
FIG. 6 is a perspective view showing the structure near the head portion of the rotation shaft of FIG. 5.
Figure 7:
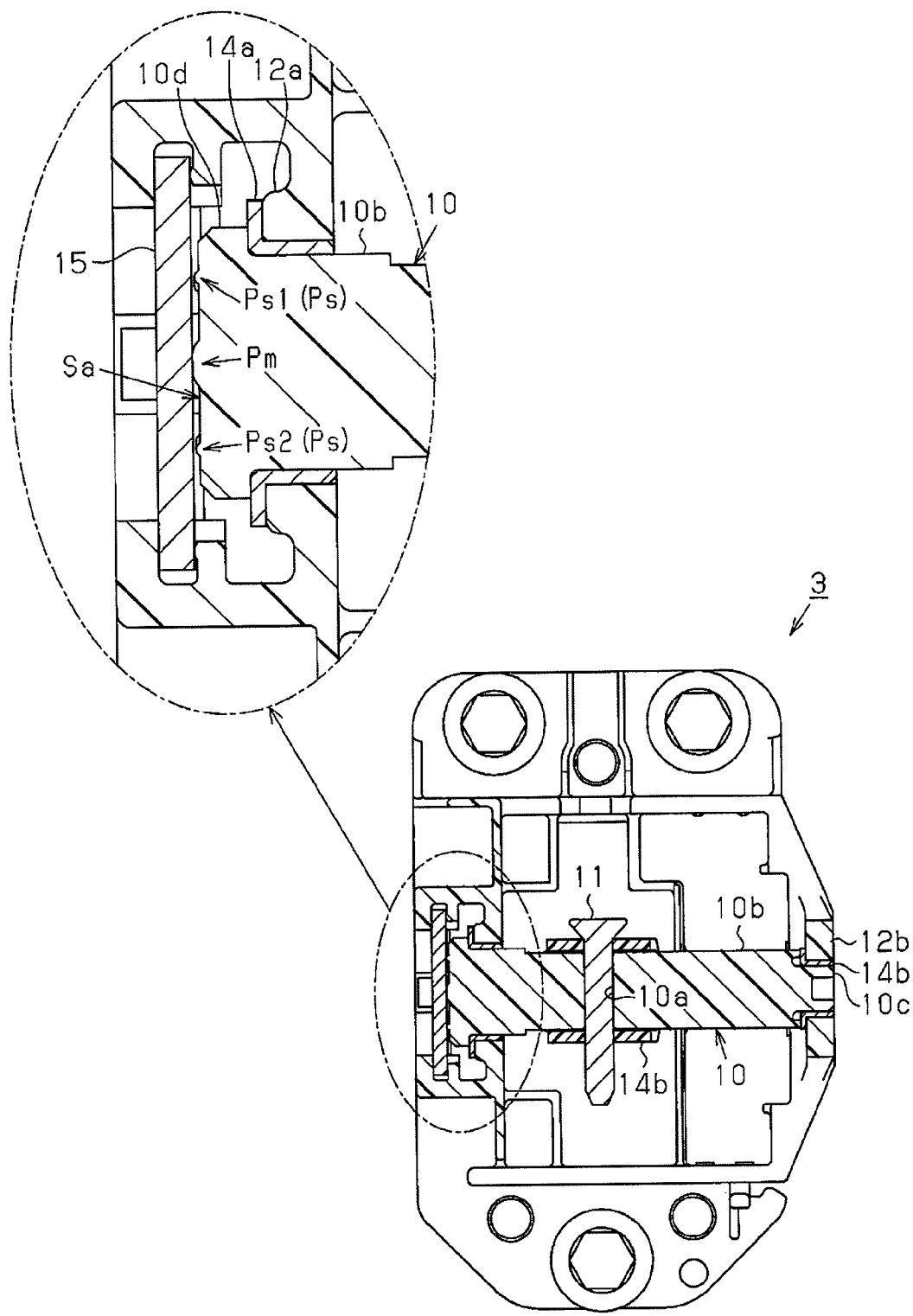
FIG. 7 is a cross-sectional view showing the cross-sectional structure taken along line A-A in FIG. 3.

FIG. 5 shows the structure of the rotation shaft 10 when viewing the peak surface Sa from an upper surface side. FIG. 6 is a perspective view showing the peak surface Sa of the rotation shaft 10. FIG. 7 shows the cross-sectional structure taken along line A-A in FIG. 3.

As shown in FIG. 5, the peak surface Sa of the rotation shaft 10 includes a main protrusion Pm, which protrudes in the axial direction of the rotation shaft 10 (direction indicated by arrow b in the drawing), and an auxiliary protrusion Ps, which also protrudes in the axial direction of the rotation shaft 10 by a protrusion amount L2 that is less than a protrusion amount L1 of the main protrusion Pm. As shown in FIG. 6, the main protrusion Pm is arranged on a center axis m of the rotation shaft 10. The peak surface Sa of the rotation shaft 10 includes two protrusions Ps1 and Ps2, which are point symmetric to a point of symmetry that is the center of the main protrusion Pm on the center axis m. The protrusions Ps1 and Ps2 form the auxiliary protrusion Ps.

Further, as shown in FIG. 7, in the present embodiment, the main protrusion Pm of the rotation shaft 10 is in contact (point contact) with the restriction member 15. Thus, when the rotation shaft 10 rotates, sliding resistance can be reduced between the rotation shaft 10 and the restriction member 15 when the rotation shaft 10 rotates. Thus, the operability can be improved when the shift lever 4 is moved in the shift direction. Further, in the present embodiment, when the main protrusion Pm wears out, the auxiliary protrusion Ps comes into contact with the restriction member 15. This ensures that the sliding resistance between the rotation shaft 10 and the restriction member 15 is not increased. Thus, the operability can be correctly maintained when the shift lever 4 is moved in the shift direction. Further, as described above, the point symmetric arrangement of the auxiliary protrusions using the center of the main protrusion Pm on the center axis m as a point of symmetry avoids a situation in which the rotation shaft 10 tilts when the auxiliary protrusion Ps comes into contact with the restriction member 15. Thus, swaying of the rotation shaft 10 can be suppressed. This suppresses loosening of the rotation shaft 10.

When arranging the auxiliary protrusion Ps on the rotation shaft 10, the inventors have conducted various experiments and obtained the following two observations.

When two protrusions are used as the auxiliary protrusion Ps, the two protrusions contact the restriction member 15.

When three or more protrusions are used as the auxiliary protrusion Ps, two of the protrusions contact the restriction member 15.

Accordingly, by using the two protrusions Ps1 and Ps2 as the auxiliary protrusion Ps, the minimum number of protrusions may be set thereby simplifying the structure of the rotation shaft 10, while also suppressing tilting of the rotation shaft 10.

As described above, the shift device of the present embodiment has the following advantages.

(1) The peak surface Sa of the rotation shaft 10 includes the main protrusion Pm, which protrudes in the axial direction. The base plate 3 includes the restriction member 15 that contacts the main protrusion Pm of the rotation shaft 10. Further, the restriction member 15 and the supports 12a and 12b cooperate to restrict movement of the rotation shaft 10 in the axial direction. This reduces sliding resistance between the restriction member 15 and the rotation shaft 10. Thus, the operability of the shift lever 4 can be improved.

(2) The peak surface Sa of the rotation shaft 10 includes the auxiliary protrusion Ps, which protrudes by a smaller protrusion amount than the main protrusion Pm. Thus, when the main protrusion Pm wears out, the auxiliary protrusion Ps comes into contact with the restriction member 15. This ensures that the sliding resistance between the rotation shaft 10 and the restriction member 15 is not increased. Thus, the operability of the shift lever 4 can be correctly maintained.

(3) The restriction member 15 includes the fitting hole 15a. Further, the base plate 3 includes the guide grooves 16, which guides the coupling of the restriction member 15, and the fitting hook 17, which is fitted to the fitting hole 15a of the restriction member 15. Thus, when manufacturing the shift device, the restriction member 15 can be fixed just by coupling the restriction member 15 to the base plate 3 along the guide grooves 16. This reduces the number of manufacturing steps.

(4) The main protrusion Pm is arranged on the center axis m of the rotation shaft 10, and the auxiliary protrusion Ps is arranged point symmetric to a point of symmetry that is the center of the main protrusion Pm on the center axis m. Thus, when the auxiliary protrusion Ps contacts the restriction member 15, a situation in which the rotation shaft 10 tilts can be avoided. This suppresses loosening of the rotation shaft 10.

(5) The auxiliary protrusion Ps is formed by the two protrusions Ps1 and Ps2, which are arranged point symmetric to a point of symmetry that is the center of the main protrusion Pm on the center axis m. This suppresses tilting of the rotation shaft with the minimum number of protrusions thereby simplifying the rotation shaft 10.

(6) The restriction member 15 includes the flange 15b. Thus, a person may use the flange 15b when coupling the restriction member 15 to the base plate 3 manually or with a jig. This improves the workability.

The above embodiment may be modified to the forms described below.

In the above embodiment, the restriction member 15 includes the flange 15b. However, the flange 15b can be omitted.

In the above embodiment, the fitting hook 17 of the base plate 3 is fitted to the fitting hole 15a of the restriction member 15 to fix the restriction member 15 to the base plate 3. That is, the base plate 3 includes the fitting hook 17, which serves as a fixing portion used to fix the restriction member 15. Instead, for example, a fitting hook may be arranged on the restriction member 15, and a fitting hole serving as a fixing portion used to fix the restriction member 15 may be arranged in the base plate 3. In this case, the fitting hook of the restriction member 15 is fitted to the fitting hole of the base plate 3 to fix the restriction member 15 to the base plate 3.

In the above embodiment, the auxiliary protrusion Ps is formed by the two protrusions Ps1 and Ps2, which are arranged point symmetric to a point of symmetry that is the center of the main protrusion Pm. Instead, the auxiliary protrusion Ps may be formed by four or more protrusions that are arranged point symmetric to a point of symmetry that is the center of the main protrusion Pm.

Figure 8:
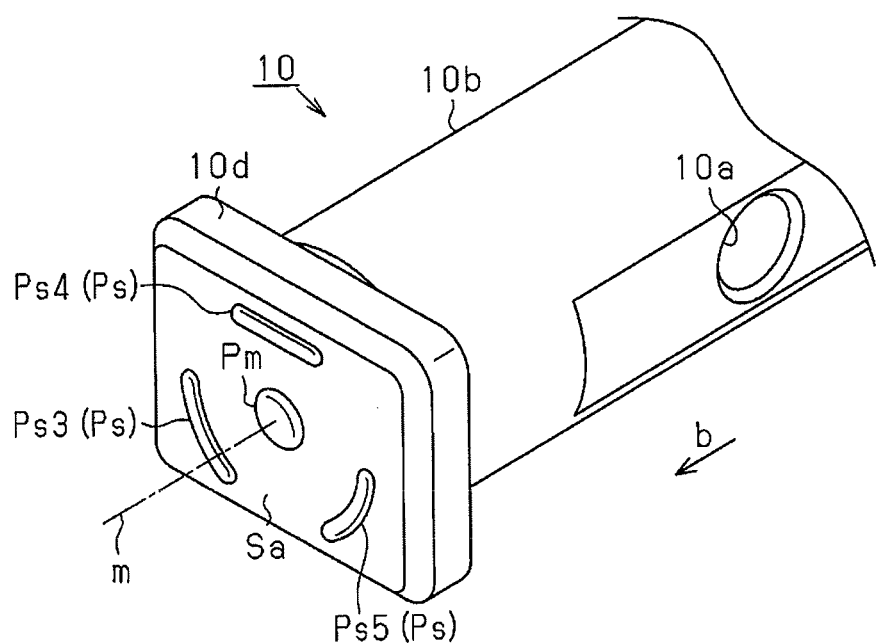
FIG. 8 is a perspective view showing another structure near the head portion of the rotation shaft that supports the shift lever of FIG. 4.

In the above embodiment, the auxiliary protrusion Ps is formed by the two protrusions Ps1 and Ps2, which are arranged point symmetric to a point of symmetry that is the center of the main protrusion Pm. However, for example, as shown in FIG. 8 that corresponds to FIG. 6, the auxiliary protrusion Ps may be formed by the three protrusions Ps3 to Ps5 arranged around the main protrusion Pm. Further, the auxiliary protrusion Ps may be formed by four or more protrusions arranged around the main protrusion Pm. As long as a protrusion protrudes in the axial direction of a rotation shaft by a protrusion amount that is less than the main protrusion Pm, the protrusion may function as the auxiliary protrusion Ps.

In the above embodiment, a support structure for a shift lever according to the present invention is applied to a by-wire type shift device but may also be applied to, for example, a shift device that mechanically couples a shift lever and a transmission.

What is claimed is:

1. A support structure for a shift lever comprising;
a rotation shaft coupled to the shift lever and including first and second end portions;
a base plate including a support that pivotally supports the first and second end portions of the rotation shaft to tiltably support the shift lever;
a restriction member coupled to the base plate in contact with the rotation shaft; and
a fixing portion that fixes the restriction member to the base plate, wherein
the base plate includes a guide that guides the coupling of the restriction member to the base plate,
the rotation shaft includes a main protrusion, which protrudes in an axial direction of the rotation shaft from an end surface at one of the first and second end portions of the rotation shaft, and an auxiliary protrusion, which protrudes in the axial direction of the rotation shaft from the end surface by a smaller protrusion amount than the main protrusion, and
the restriction member is fixed in contact with the main protrusion of the rotation shaft so that the restriction member cooperates with the support to restrict movement of the rotation shaft in the axial direction.

2. The support structure for the shift lever according to claim 1, wherein the main protrusion is arranged on a center axis of the rotation shaft, and the auxiliary protrusion is arranged point symmetric to a point of symmetry that is the center of the main protrusion on the center axis.

3. The support structure for the shift lever according to claim 2, wherein the auxiliary protrusion includes two protrusions that are arranged point symmetric to the point of symmetry that is the center of the main protrusion on the center axis.

4. The support structure for the shift lever according to claim 1, wherein the main protrusion is arranged on a center axis of the rotation shaft, and the auxiliary protrusion includes three protrusions arranged around the main protrusion.

5. The support structure for the shift lever according to claim 1, wherein the restriction member is plate-shaped and includes a fitting hole extending through the restriction member in a plate thickness direction, and the fixing portion includes a fitting hook fitted to the fitting hole of the restriction member.

6. The support structure for the shift lever according to claim 1, wherein the restriction member includes an end portion that has a flange.

7. The support structure for the shift lever according to claim 1, wherein
the rotation shaft includes a shaft portion, which includes the first and second end portions, and a head portion, which is provided at the first end portion of the shaft portion,
the main protrusion and the auxiliary protrusion are arranged on an end surface of the head portion,
the support includes a first support and a second support,
the head portion is held between the restriction member, which contacts the main protrusion, and the first support, and
the second end portion of the shaft portion is supported by the second support.

* * * * *